United States Patent [19]

Hosoi et al.

[11] Patent Number: 4,926,045

[45] Date of Patent: * May 15, 1990

[54] RADIATION IMAGE READ-OUT APPARATUS

[75] Inventors: Yuichi Hosoi; Kenji Takahashi; Satoshi Arakawa, all of Kanagawa, Japan

[73] Assignee: Fuji Photo Film Co., Ltd., Kanagawa, Japan

[*] Notice: The portion of the term of this patent subsequent to Jan. 23, 2007 has been disclaimed.

[21] Appl. No.: 220,431

[22] Filed: Jul. 13, 1988

Related U.S. Application Data

[63] Continuation of Ser. No. 24,113, Mar. 10, 1987, abandoned.

[30] Foreign Application Priority Data

Mar. 10, 1986 [JP] Japan .................. 61-51664
Mar. 10, 1986 [JP] Japan .................. 61-51665
Jan. 16, 1987 [JP] Japan .................. 62-8568

[51] Int. Cl.$^5$ .................................. G01N 23/04
[52] U.S. Cl. ......................... 250/327.2; 250/484.1
[58] Field of Search .................... 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,302,672 | 11/1981 | Kato et al. | 250/327.2 |
| 4,310,886 | 1/1982 | Kato et al. | 250/327.2 |
| 4,315,318 | 7/1982 | Kato et al. | 250/337 |
| 4,346,295 | 8/1982 | Tanaka et al. | 250/327.2 |
| 4,369,367 | 1/1983 | Horikawa | 250/327.2 |
| 4,387,428 | 6/1983 | Ishida et al. | 250/337 |
| 4,400,619 | 8/1983 | Kotera et al. | 250/327.2 |
| 4,527,060 | 7/1985 | Suzuki et al. | 250/327.2 |
| 4,543,479 | 9/1985 | Kato | 250/327.2 |
| 4,582,988 | 4/1986 | Aagano | 250/327.2 |
| 4,661,704 | 4/1987 | de Leeuw et al. | 250/484.1 |
| 4,691,232 | 9/1987 | Lange | 250/327.2 |

FOREIGN PATENT DOCUMENTS

| | | |
|---|---|---|
| 31952 | 7/1981 | European Pat. Off. |
| 77677 | 4/1983 | European Pat. Off. |
| 137674 | 4/1983 | European Pat. Off. |

*Primary Examiner*—Carolyn E. Fields
*Attorney, Agent, or Firm*—Sughrue, Mion, Zinn, Macpeak & Seas

[57] ABSTRACT

A radiation image read-out apparatus is constituted for exposing a recording material provided with a stimulable phosphor and carrying a radiation image stored thereon to stimulating rays which cause the recording material to emit light in proportion to the stored radiation energy, and photoelectrically detecting the emitted light by a photodetector to read out the radiation image. The photodetector is disposed on the side opposite to the stimulating ray irradiation side with respect to the recording material. A multi-layer optical filter substantially reflecting stimulating rays and substantially transmitting the light emitted by the recording material is disposed between the recording material and the photodetector.

18 Claims, 8 Drawing Sheets

RADIATION IMAGE READ-OUT APPARATUS

This is a continuation of application Ser. No. 24,113 filed Mar. 10, 1987, now abandoned.

BACKGROUND OF THE INVENTION

1. Field of the Invention

This invention relates to a radiation image readout apparatus for reading out a radiation image stored on a recording material composed of a stimulable phosphor, such as a stimulable phosphor sheet, by exposing the recording material to stimulating rays which cause it to emit light in proportion to the stored radiation energy, and photoelectrically detecting the light emitted by the recording material. This invention particularly relates to a radiation image read-out apparatus wherein the efficiency of utilizing the stimulating rays is improved by use of a multi-layer optical filter.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to an electric image signal by a photodetector, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device.

In the aforesaid radiation image recording and reproducing system, read out of the light emitted by the stimulable phosphor sheet is conducted by one of the two methods as described below. In a first read-out method, division into picture elements is effected by the scanning with stimulating rays, and the light emitted by the stimulable phosphor sheet is detected by a light receiving device having a wide light receiving face, for example, a photomultiplier. The first read-out method is realized by a radiation image read-out apparatus wherein the stimulable phosphor sheet carrying a radiation image stored thereon is two-dimensionally scanned with stimulating rays, and the light emitted by the scanned portion of the stimulable phosphor sheet is photoelectrically detected by use of a photodetector. On the other hand, in a second read-out method, division into picture elements is effected by a light receiving device such as a two-dimensional solid state image pickup device or a semiconductor line sensor, and image signals are sequentially generated by an electric circuit. The second read-out method is realized by a radiation image read-out apparatus comprising a stimulating ray source for emitting stimulating rays to the stimulable phosphor sheet carrying a radiation image stored thereon, and a photodetector constituted by a photoelectric conversion device divided into picture elements and disposed to face the stimulable phosphor sheet.

On the other hand, in the aforesaid radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects respectively on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be erased by exposure to light or heat as described, for example, in U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed two types of the radiation image read-out apparatuses (i.e. radiation image recording and read-out apparatuses) as described below which comprise, built in a single unit, an image recording section for storing a radiation image of an object on a recording material composed of a stimulable phosphor, such as a stimulable phosphor sheet, an image read-out section for exposing the recording material to stimulating rays and photoelectrically reading out light emitted by the recording material in proportion to the stored radiation energy to obtain an image signal, and an erasing section for releasing residual radiation energy from the recording material before image recording is conducted on the recording material subjected to image read-out, whereby the recording material is circulated and reused in the apparatus.

One of the aforesaid two types of the radiation image recording and read-out apparatuses comprises:

(i) a circulation and conveyance means for conveying at least one stimulable phosphor sheet for recording a radiation image thereon along a predetermined circulation path, (ii) an image recording section disposed on said circulation path for recording a radiation image on said stimulable phosphor sheet by exposing said stimulable phosphor sheet to a radiation carrying image information, (iii) an image read-out section disposed on said circulation path and provided with a stimulating ray source for emitting stimulating rays for scanning said stimulable phosphor sheet carrying said radiation image stored thereon at said image recording section, and a photoelectric readout means for detecting light emitted by said stimulable phosphor sheet scanned by said stimulating rays to obtain an electric image signal, and (iv) an erasing section disposed on said circulation path for, prior to the next image recording on said stimulable phosphor sheet for which the image read out has been conducted at said image read-out section, having said stimulable phosphor sheet release the radiation energy remaining on said stimulable phosphor sheet. This type of the radiation image recording and read-out apparatus is disclosed in Japanese Unexamined Patent Publication No. 59(1984)-192240, and will hereinbelow be referred to as the built-in type apparatus I.

The other of the aforesaid two types of the radiation image recording and read-out apparatuses comprises:

(a) a supporting material, (b) at least one recording material fixed on said supporting material and comprised of a stimulable phosphor layer capable of storing a radiation image, (c) an image recording section for exposing said recording material to a radiation passing through an object to have a radiation image of the object stored on said recording material, (d) an image read-out section provided with a stimulating ray source for emitting stimulating rays for scanning said recording material carrying said radiation image stored thereon, and a photoelectric read-out means for obtaining an electric image signal by reading out light emitted by said recording material scanned and stimulated with the stimulating rays, (e) a means for circulating said recording material on said supporting material with respect to said image read-out section for enabling reuse of said recording material by repeatedly moving said supporting material and said image read-out section with respect to each other, and (f) an erasing means for eliminating the radiation energy remaining on said recording material prior to image recording on said recording material after the radiation image is read out therefrom at said image read-out section. This type of the radiation image recording and read-out apparatus is disclosed in Japanese Unexamined Patent Publication No. 58(1983)-200269, and will hereinbelow be referred to as the built-in type apparatus II.

On the other hand, in the aforesaid radiation image read-out apparatus, the drawback that the efficiency of utilization of stimulating rays is low has heretofore been found to arise. Specifically, since a part of stimulating rays impinging upon a surface of the recording material composed of a stimulable phosphor, such as the stimulable phosphor sheet, passes through the recording material without stimulating the stimulable phosphor and emanates from the other surface of the recording material, stimulating rays are not efficiently utilized for stimulation of the stimulable phosphor. Therefore, particularly in the case where image read-out is to be conducted with a high sensitivity, a stimulating ray source having a large output becomes necessary, and the power requirement becomes large.

SUMMARY OF THE INVENTION

The primary object of the present invention is to provide a radiation image read-out apparatus which substantially improves the efficiency of utilization of stimulating rays.

Another object of the present invention is to provide a radiation image read-out apparatus which conducts image read-out with a high sensitivity by use of a stimulating ray source having a small output.

The present invention provides, in its broad aspect, a radiation image read-out apparatus for exposing a recording material provided with a stimulable phosphor and carrying a radiation image stored thereon to stimulating rays which cause said recording material to emit light in proportion to the stored radiation energy, and photoelectrically detecting the emitted light by use of a photodetector to read out said radiation image, wherein the improvement comprises disposing said photodetector on the side opposite to the stimulating ray irradiation side with respect to said recording material, and providing a multi-layer optical filter which substantially reflects said stimulating rays and substantially transmits said light emitted by said recording material, said multi-layer optical filter being disposed between said recording material and said photodetector.

The present invention also embraces the following aspects:

[I] A radiation image read-out apparatus for two-dimensionally scanning a stimulable phosphor sheet, which carries a radiation image stored thereon, with stimulating rays which cause said stimulable phosphor sheet to emit light in proportion to the stored radiation energy, and photoelectrically reading out the light emitted by the scanned portion of said stimulable phosphor sheet by use of a photodetector, wherein the improvement comprises disposing said photodetector on the side opposite to the stimulating ray irradiation side with respect to said stimulable phosphor sheet, and providing a multi-layer optical filter which substantially reflects said stimulating rays and substantially transmits said light emitted by said stimulable phosphor sheet, said multi-layer optical filter being disposed between said stimulable phosphor sheet and said photodetector.

[II] A radiation image read-out apparatus including a stimulating ray source for emitting stimulating rays to a stimulable phosphor sheet carrying a radiation image stored thereon, and a photodetector constituted by a photoelectric conversion device, which is divided into picture elements, and disposed to face said stimulable phosphor sheet, wherein the improvement comprises disposing said photodetector on the side opposite to the stimulating ray irradiation side with respect to said stimulable phosphor sheet so that said photodetector stands facing said stimulable phosphor sheet, and providing a multi-layer optical filter which substantially reflects said stimulating rays and substantially transmits said light emitted by said stimulable phosphor sheet upon exposure to said stimulating rays, said multi-layer optical filter being disposed between said stimulable phosphor sheet and said photodetector.

[III] A built-in type apparatus I as mentioned above, wherein the improvement comprises disposing said photoelectric read-out means on the side opposite to the stimulating ray irradiation side with respect to said stimulable phosphor sheet at said image read-out section, and providing a multi-layer optical filter which substantially reflects said stimulating rays and substantially transmits said light emitted by said stimulable phosphor sheet, said multi-layer optical filter being disposed between said stimulable phosphor sheet and said photoelectric read-out means.

[IV] A built-in type apparatus II as mentioned above, wherein the improvement comprises constituting said supporting material by a transparent material, disposing said photoelectric read-out means on the side opposite to the stimulating ray irradiation side with respect to said recording material at said image read out section, and providing a multi-layer optical filter which substantially reflects said stimulating rays and substantially transmits said light emitted by said recording material, said multi-layer optical filter being disposed between said recording material and said photoelectric read-out means.

The multi-layer optical filter constituting a requirement of the radiation image read-out apparatus in accordance with the present invention is fabricated by sequentially overlaying several to several tens of layers of two or more materials exhibiting different refractive indices to a thickness within the range of approximately one half to approximately one fourth of the light wavelength on a support. In this case, it is possible to obtain various characteristics by adjusting the refractive indices and the film thicknesses of the respective materials. As a low refractive index material, it is possible to use $SiO_2$, $MgF_2$, or the like. As a high refractive index material, it is possible to use $TiO_2$, $ZrO_2$, $ZnS$, or the like. Also, a dichroic filter or the like may be used as the multi-layer optical filter exhibiting the transmittance and reflectivity characteristics as mentioned above.

The multi-layer optical filter should preferably be adjusted so that the stimulating ray reflectivity is not lower than 60%, and the stimulating ray transmittance is not lower than 60%.

The term "disposing a multi-layer optical filter between a recording material provided with a stimulable phosphor and a photodetector" as used herein embraces the case where the multi-layer optical filter is disposed in contact with the surface of the photodetector, the case where the multi-layer optical filter is directly formed on the surface of the photodetector, the case where the multi-layer optical filter is disposed in contact with the surface of the recording material on the photodetector side, the case where the multi-layer optical filter is directly formed on the surface of the recording material on the photodetector side, and the case where the multi-layer optical filter is disposed in slightly spaced relation to the recording material and the photodetector.

Also, in the radiation image read-out apparatus mentioned in [II] above, as said photodetector, it is possible to use a photodetector having an ordinary configuration which need not allow stimulating rays to pass therethrough, for example, a photodetector comprising a light shielding support, and an electrode layer, a photoconductor layer, and a divided transparent electrode layer which are overlaid on the light shielding support as disclosed in, for example, Japanese Unexamined Patent Publication No. 60(1985)-111568.

When the multi-layer optical filter is disposed between the recording material composed of a stimulable phosphor and the photodetector, most of the stimulating rays passing through the recording material without stimulating it are reflected by the multi-layer optical filter toward the recording material. Thus the stimulating rays passing through the recording material are confined between the recording material and the multi-layer optical filter and are efficiently utilized for stimulation of the stimulable phosphor.

On the other hand, the light emitted by the recording material when it is exposed to stimulating rays also emanates from the recording material. Since the emitted light substantially passes through the multi-layer optical filter having the characteristics as mentioned above, the emitted light can be efficiently detected by the photodetector.

Accordingly, with the radiation image read-out apparatus in accordance with the present invention, it is possible to substantially increase the radiation image readout sensitivity by use of a stimulating ray source having a small output and by decreasing the power requirement.

DESCRIPTION OF THE PREFERRED EMBODIMENTS

The present invention will hereinbelow be described in further detail with reference to the accompanying drawings.

Figure 1:
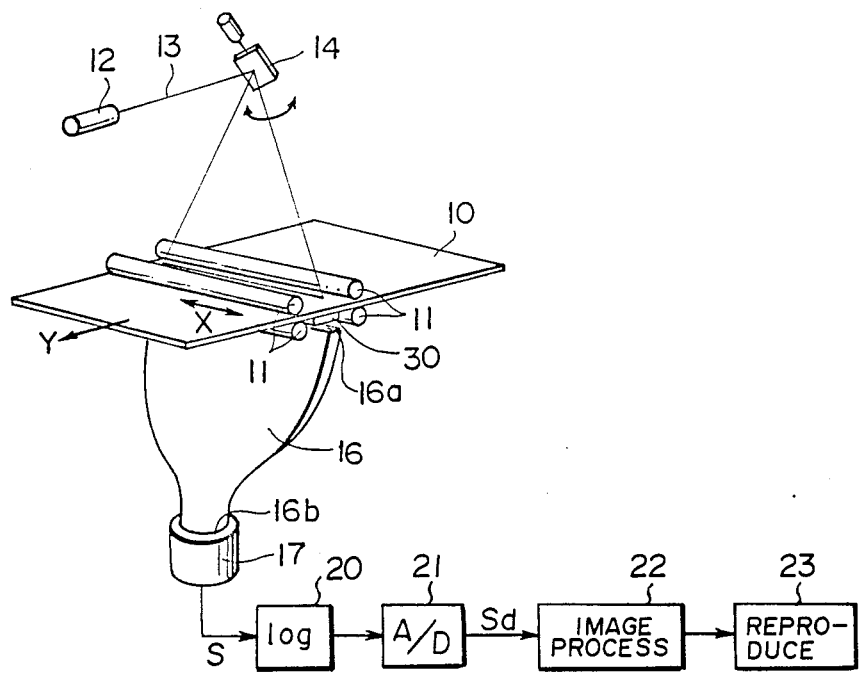
FIG. 1 is a schematic perspective view showing a first embodiment of the radiation image read-out apparatus in accordance with the present invention.
Figure 2:
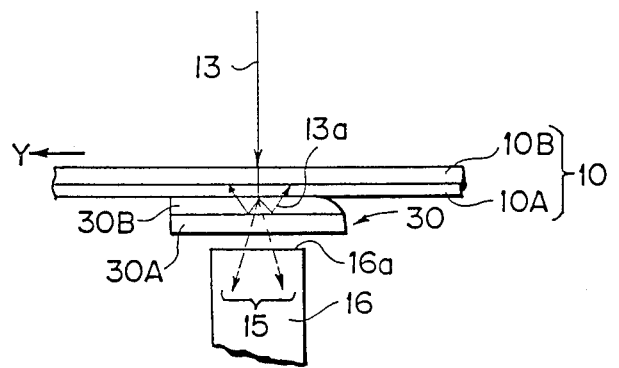
FIG. 2 is an enlarged side view showing the major part of the first embodiment.

Referring to FIGS. 1 and 2 showing a first embodiment of the radiation image read-out apparatus in accordance with the present invention, a stimulable phosphor sheet 10 carrying a radiation image of an object such as the human body stored thereon by being exposed to a radiation such as X-rays passing through the object is conveyed by a sheet conveyance means 11 comprising two pairs of nip rollers or the like in a sub-scanning direction as indicated by the arrow Y as shown in FIG. 1. A laser beam 13 emitted as stimulating rays by a laser beam source 12 is deflected by a galvanometer mirror 14 swinging in both ways, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 passes through a multi-layer optical filter 30 as described later, is guided by a light guide member 16 disposed on the side opposite to the stimulating ray irradiation side with respect to the stimulable phosphor sheet 10, and is photoelectrically detected by a photomultiplier 17. The light guide member 16 is made by forming a light guiding material such as an acrylic plate, and has a linear light input face 16a positioned to extend along the beam scanning line on the stimulable phosphor sheet 10, and a ring-shaped light output face 16b closely contacted with a light receiving face of the photomultiplier 17. The emitted light 15 entering the light guide member 16 from its light input face 16a is guided through total reflection inside of the light guide member 16, emanates from the light output face 16b, and is received by the photomultiplier 17. In this manner, the amount of the emitted light 15 carrying the radiation image information is detected by the photomultiplier 17. In this embodiment, a photodetector is constituted by the light guide member 16 and the photomultiplier 17.

An analog output signal (read-out image signal) S generated by the photomultiplier 17 is amplified by a logarithmic amplifier 20, and digitized with a predetermined scale factor by an A/D converter 21. A digital read-out image signal Sd thus obtained is sent to an image reproducing apparatus 23 such as a light beam scanning recording apparatus via an image processing device 22, and the radiation image which was stored on the stimulable phosphor sheet 10 is reproduced as a visible image by the image reproducing apparatus 23.

Figure 3:
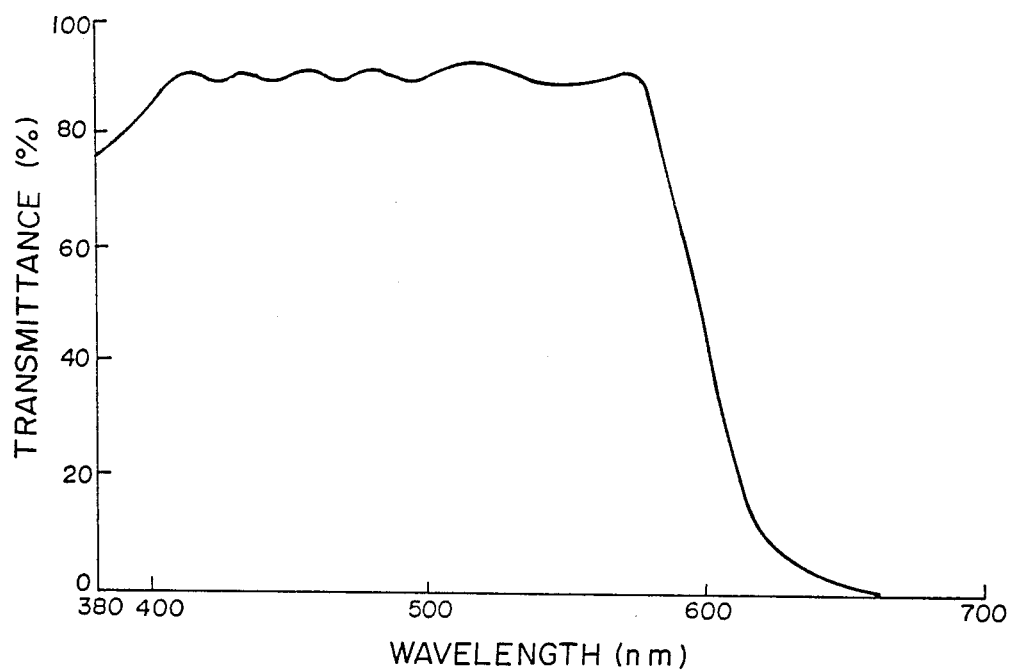
FIG. 3 is a graph showing spectral transmittance characteristics of a multi-layer optical filter employed in accordance with the present invention.

Effects of the multi-layer optical filter 30 will hereinbelow be described in detail. By way of example, the multi-layer optical filter 30 is a dichroic filter exhibiting the spectral transmittance characteristics as shown in FIG. 3. As shown in FIG. 2, the multi-layer optical filter 30 is composed of a glass support 30A and a multi-layer film 30B formed on the surface of the glass support 30A. In this embodiment, the stimulable phosphor sheet 10 is composed of a transparent supporting material 10A and a stimulable phosphor layer 10B overlaid on the supporting material 10A. The multi-layer optical filter 30 is disposed so that the multi-layer film 30B directly contacts the supporting material 10A. The transparent supporting material 10A need not necessarily be provided, and a transparent protective film or the like may be overlaid on the upper surface of the stimulable phosphor layer 10B.

The multi-layer optical filter 30 absorbs little light, and therefore a value calculated by subtracting the transmittance shown in FIG. 3 from 1 (100%) represents the reflectivity. In this embodiment, a beam having a wavelength of 633 nm emitted by a He-Ne laser is used as the laser beam 13 acting as stimulating rays. As shown in FIG. 3, the reflectivity of the multi-layer optical filter 30 with respect to the beam having a wavelength of 633 nm is approximately 90%.

On the other hand, the stimulable phosphor sheet 10 subjected to image read-out in this embodiment is of the type emitting the light 15 having a wavelength within the range of 360 nm to 420 nm (mainly a wavelength of 390 nm) when the sheet 10 is stimulated by said laser beam 13. As shown in FIG. 3, the transmittance of the multi-layer optical filter 30 with respect to light having a wavelength of 390 nm is approximately 80%.

The laser beam 13 as stimulating rays is made to impinge upon the stimulable phosphor sheet 10 as mentioned above, and stimulates the stimulable phosphor layer 10B. A part 13a of the laser beam 13 passes through the stimulable phosphor sheet 10 without stimulating it, and emanates to the side below the sheet 10. The laser beam 13a thus passing through the stimulable phosphor sheet 10 is reflected with a high reflectivity by the multi-layer optical filter 30 exhibiting the aforesaid characteristics to the stimulable phosphor sheet 10, and stimulates the stimulable phosphor layer 10B. Thus, in this embodiment, the laser beam 13 as stimulating rays is confined between the multi-layer optical filter 30 and the stimulable phosphor sheet 10, and is efficiently utilized for stimulating the stimulable phosphor layer 10B.

Though also the light 15 emitted by the stimulable phosphor sheet 10 impinges upon the multi-layer optical filter 30, the multi-layer optical filter 30 substantially transmits the emitted light 15 as shown in FIG. 3. Therefore, the emitted light is efficiently guided by the light guide member 16. Thus with this embodiment, since the multi-layer optical filter 30 is used, it is possible to increase the amount of the light emitted by the stimulable phosphor sheet by efficiently utilizing the laser beam as stimulating rays without adversely affecting detection of the emitted light, thereby markedly increasing the sensitivity of the read-out apparatus as compared with the conventional apparatus.

The multi-layer optical filter used in the first embodiment exhibits such very preferable characteristics that it transmits nearly 80% of the light emitted by the stimulable phosphor sheet and impinging upon the multi-layer optical filter and reflects approximately 90% of stimulating rays. In general, the desirable effects of increasing the sensitivity can be achieved in the case where the stimulating ray reflectivity is not lower than 60%, and the transmittance with respect to the light emitted by the stimulable phosphor sheet is not lower than 60%. As the support for supporting the multi-layer film, besides the aforesaid glass support, it is also possible to use a transparent plastic material sheet formed of polyethylene terephthalate, polyethylene, polyvinylidene chloride polyamide, or the like.

Experiments conducted by the inventors revealed that, when the efficiency of utilization of stimulating rays is increased by the provision of the multi-layer optical filter 30, it is possible to increase the read-out sensitivity by approximately two times the sensitivity obtained without providing the multi-layer optical filter 30.

Figure 4:
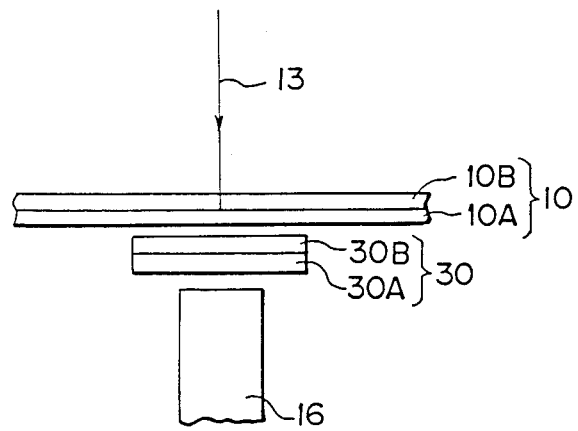
FIG. 4 is a side view showing a modified form of the major part of the first embodiment.

Though the multi-layer optical filter 30 is disposed to contact the stimulable phosphor sheet 10, the multi-layer optical filter 30 may also be disposed to contact the light guide member 16, or may be directly formed on the light input face 16a of the light guide member 16. Also, as shown in FIG. 4, the multi-layer optical filter 30 may also be disposed in slightly spaced relation to the stimulable phosphor sheet 10 and the light guide member 16. In general, read out of the radiation image is conducted by moving the stimulable phosphor sheet 10 in the sub scanning direction. Therefore, when the multi-layer optical filter 30 is disposed in slightly spaced relation to the stimulable phosphor sheet 10, it becomes possible to prevent the stimulable phosphor sheet 10 and the multi-layer optical filter 30 from wearing. In the case where the multi-layer optical filter 30 is disposed in this manner, since the contrast transfer function further deteriorates, the aforesaid processing for improving the contrast transfer function should be conducted when necessary.

Also, instead of constituting the multi-layer optical filter 30 for movement with respect to the stimulable phosphor sheet 10, the multi-layer optical filter may temporarily be closely contacted with with the overall scanning region of the sheet, and a filter feed means may be disposed besides the sub-scanning means for the sheet, thereby feeding the multi-layer optical filter together with the sheet in the sub-scanning direction. Alternatively, the multi-layer optical filter 30 may be overlaid on the whole surface of the transparent supporting material 10A of the stimulable phosphor sheet 10, or the multi-layer film may be overlaid on the whole surface of the stimulable phosphor layer 10B by using the transparent supporting material 10A as the support, thereby disposing the multi-layer optical filter 30 between the stimulable phosphor sheet 10 and the light guide member 16.

Figure 5:
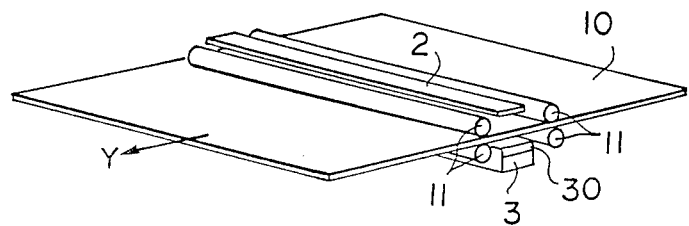
FIG. 5 is a schematic perspective view showing a second embodiment of the radiation image read-out apparatus in accordance with the present invention.

A second embodiment of the radiation image readout apparatus in accordance with the present invention will hereinbelow be described with reference to FIGS. 5, 6 and 7. In the second embodiment, the read-out section is constituted as, by way of example, a line sensor. As shown in FIG. 5, the stimulable phosphor sheet 10 carrying a radiation image stored thereon by being exposed to a radiation such as X-rays passing through an object such as the human body is conveyed by the sheet conveyance means 11 constituted by two pairs of nip rollers or the like in the sub-scanning direction as indicated by the arrow Y. A line sensor 3 is disposed below the stimulable phosphor sheet 10 in close relation thereto. The line sensor 3 is disposed to extend over the overall width of the recording region of the stimulable phosphor sheet 10 in the direction approximately normal to the sub-scanning direction as indicated by the arrow Y. A linear stimulating ray source 2 extending to face the line sensor 3 via the stimulable phosphor sheet 10 is disposed above the stimulable phosphor sheet 10. As the linear stimulating ray source 2, it is possible to use, for example, an array comprising light emitting diodes or semiconductor lasers arrayed in a line and turned on simultaneously, or a non-directional light source such as a combination of a fluorescent lamp or a Xe lamp with an aperture member provided with a slit or a series of small holes.

Figure 6:
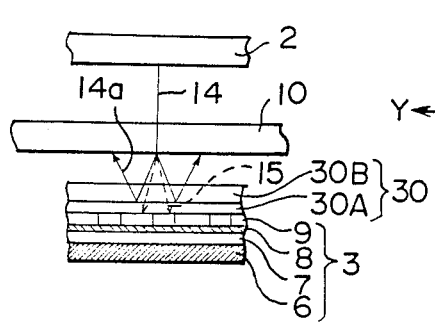
FIGS. 6 and 7 are a sectional front view and a sectional side view showing the major part of the second embodiment.
Figure 7:
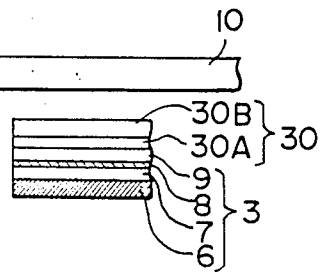

FIGS. 6 and 7 are respectively a sectional front view and a sectional side view of the line sensor 3. The line sensor 3 will hereinbelow be described in detail with reference to FIGS. 6 and 7. The line sensor 3 is fabricated by stacking a transparent electrode layer 7, a thin photoconductor layer 8, and a transparent electrode layer 9 on a light shielding support 6. By dividing the transparent electrode layer 7 and/or the transparent electrode layer 9 in accordance with picture elements, many solid state photoelectric conversion devices corresponding to the picture elements are formed in the stack. In this embodiment, by way of example, the transparent electrode layer 9 is divided in accordance with the picture elements. A multi-layer optical filter 30 as described later is formed on the surface of the transparent electrode layer 9 facing the stimulable phosphor sheet 10.

When the radiation image is to be read out from the stimulable phosphor sheet 10, the sheet 10 is linearly exposed to stimulating rays 14 emitted by the stimulating ray source 2. The light 15 emitted by the stimulable phosphor sheet 10 in proportion to the stored radiation energy when it is exposed to the stimulating rays 14 is received by the photoconductor layer 8 via the transparent electrode layer 9. The photoconductor layer 8 is constituted by a photoconductor exhibiting an energy gap Eg smaller than the energy $hc/\lambda 2$ ($=h\nu 2$) of the light 15 emitted by the stimulable phosphor sheet 10.

The transparent electrode layer 9 (constituted, e.g. by ITO) is divided into very small units in the longitudinal direction of the line sensor 3. The difference in potential arising between one divided unit of the transparent electrode layer 9 and the transparent electrode layer 7, i.e. the difference in potential generated by accumulation of signals caused by photocarriers generated upon receiving of the light emitted by the stimulable phosphor sheet 10 inside of the transparent electrode layer between the transparent electrode layers 7 and 9, corresponds to an image signal of one picture element. The signals caused by photocarriers, which are obtained at the divided electrode units are time-serially read out by use of a shift register as described later. In this manner, image signals of one scanning line are obtained. Thereafter, the aforesaid operation is repeated each time the stimulable phosphor sheet 10 is moved with respect to the stimulating ray source 2 and the line sensor 3 by a distance equal to the spacing of one scanning line in the direction as indicated by the arrow Y, and the radiation image over the overall surface of the stimulable phosphor sheet 10 is read out as time-serial image signals.

Figure 8:
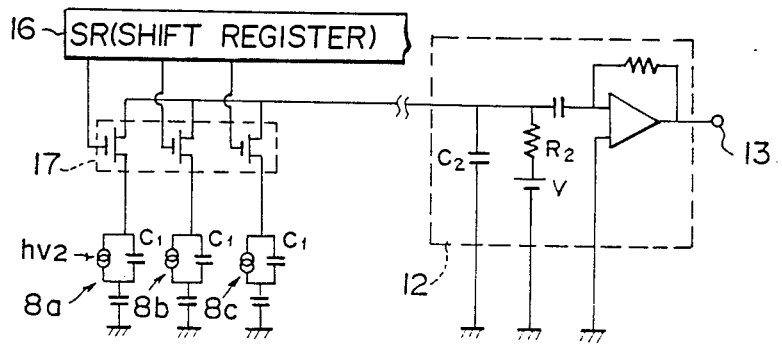
FIG. 8 is a circuit diagram showing the scanning circuit employed in the second embodiment.

A scanning circuit following the line sensor 3 will be described hereinbelow. FIG. 8 is an equivalent circuit diagram showing a line sensor using a photoconductor and a scanning circuit. Signals caused by photocarriers generated when light (hv2) emitted by a stimulable phosphor sheet impinges upon solid state photoelectric conversion devices 8a, 8b, and 8c using a photoconductor are accumulated at capacitors C1, C1, C1 of the solid state photoelectric conversion devices 8a, 8b, and 8c. The accumulated signals of the photocarriers are sequentially read out by switching of a switch section 17 carried out by a shift register 16, and time-serial image signals are obtained thereby. The image signals are then amplified by an amplifier 12 and are sent out from an output terminal 13 of the amplifier 12.

The MOS section comprising the switch section 17 and the shift register 16 may be replaced by a charge coupled device (CCD). Also, the line sensor 3 may be constituted by a photodiode array as disclosed in, for example, Japanese Unexamined Patent Publication No. 60(1985)-111568.

Also, though the photodetector is constituted as the line sensor comprising a plurality of the solid state photoelectric conversion devices arrayed in a line in the fourth embodiment, the photodetector may be constituted as a point sensor composed of a single solid state photoelectric conversion device, or a surface sensor composed of solid state photoelectric conversion devices arrayed two-dimensionally.

Effects of the multi-layer optical filter 30 in the second embodiment will hereinbelow be described in detail. By way of example, the multi-layer optical filter 30 is of the same type as the dichroic filter used in the aforesaid first embodiment, and exhibits the spectral transmittance characteristics as shown in FIG. 3. As shown in FIGS. 6 and 7, the multi-layer optical filter 30 is composed of a glass support 30A and a multi-layer film 30B formed on the surface of the glass support 30A. In this embodiment, the multi-layer optical filter 30 is disposed so that the support 30A closely contacts the transparent electrode layer 9 of the line sensor 3 and the multi-layer film 30B is slightly spaced from the stimulable phosphor sheet 10.

In this embodiment, like the first embodiment, a beam having a wavelength of 633 nm emitted by a He-Ne laser is used as the laser beam 14 acting as stimulating rays, and the stimulable phosphor sheet 10 subjected to image read-out is of the type emitting the light 15 having a wavelength within the range of 360 nm to 420 nm (mainly a wavelength of 390 nm) when the sheet 10 is stimulated by said laser beam 14. Therefore, the multi-layer optical filter 30 has the same effects as in the aforesaid first embodiment. Specifically, with this embodiment, it is possible to increase the amount of the light emitted by the stimulable phosphor sheet by efficiently utilizing the laser beam as stimulating rays without adversely affecting detection of the emitted light, thereby markedly increasing the sensitivity of the read-out apparatus as compared with the conventional apparatus.

The multi-layer optical filter used in the second embodiment exhibits such very preferable characteristics that it transmits nearly 80% of the light emitted by the stimulable phosphor sheet and impinging upon the multi-layer optical filter and reflects approximately 90% of stimulating rays. In general, as mentioned with reference to the first embodiment, the desirable effects of increasing the sensitivity can be achieved in the case where the stimulating ray reflectivity is not lower than 60%, and the transmittance with respect to the light emitted by the stimulable phosphor sheet is not lower than 60%. As the support for supporting the multi-layer film, besides the aforesaid glass support, it is also possible to use a transparent plastic material sheet formed of polyethylene terephthalate, polyethylene, polyvinylidene chloride, polyamide, or the like.

Experiments conducted by the inventors revealed that, when the efficiency of utilization of stimulating rays is increased by the provision of the multi-layer optical filter 30 as in the second embodiment, it is possible to increase the read-out sensitivity by approximately 1.5 times the sensitivity obtained without providing the multi-layer optical filter 30.

A lens optical system for guiding the light emitted by the stimulable phosphor sheet 10 (for example, a rod lens array) may be disposed between the multi-layer optical filter 30 contacting the line sensor 3 and the stimulable phosphor sheet 10. In this case, the stimulating rays (transmitted light rays) 14a passing through the stimulable phosphor sheet 10 and impinging upon the multi-layer optical filter 30 via the lens optical system are reflected by the multi-layer optical filter 30, made to again pass along nearly the same optical path in the lens optical system, and return onto the stimulable phosphor sheet 10. Therefore, the stimulating rays 14a are turned back to nearly the same position on the stimulable phosphor sheet 10, and the stimulation efficiency becomes high.

Figure 9:
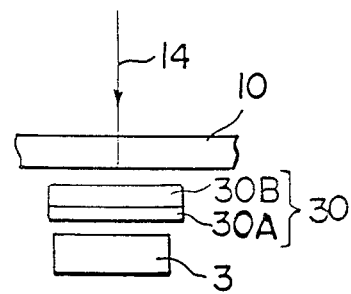
FIG. 9 is side view showing a modified form of the major part of the second embodiment.

Though the multi-layer optical filter 30 is disposed to contact the line sensor 3, the multi-layer optical filter 30 may also be directly formed on the line sensor 3, or may be disposed to contact the stimulable phosphor sheet 10. Also, as shown in FIG. 9, the multi-layer optical filter 30 may also be disposed in slightly spaced relation to the line sensor 3 and the stimulable phosphor sheet 10.

Also, instead of constituting the multi-layer optical filter 30 for movement with respect to the stimulable phosphor sheet 10, the multi-layer optical filter may temporarily be closely contacted with with the overall scanning region of the sheet, and a filter feed means may be disposed besides the sub-scanning means for the sheet, thereby feeding the multi-layer optical filter together with the sheet in the sub-scanning direction. In this case, the operations of returning the multi-layer optical filter 30 from the stimulable phosphor sheet 10, on which the image read-out has been finished, to the read-out start position and then superposing the multi-layer optical filter 30 on the next sheet 1 sent to the image read-out step may be repeated. With this method, only a single multi-layer optical filter 30 may be provided. Alternatively, the multi-layer optical filter 30 may be overlaid on the whole surface of the stimulable phosphor sheet 10 on the side of the line sensor 3, thereby disposing the multi-layer optical filter 30 between the line sensor 3 and the stimulable phosphor sheet 10.

A third embodiment of the radiation image read-out apparatus in accordance with the present invention, wherein the multi-layer optical filter substantially reflecting stimulating rays and substantially transmitting light emitted by the recording material is applied to the aforesaid built-in type apparatus I, will hereinbelow be described.

Figure 11:
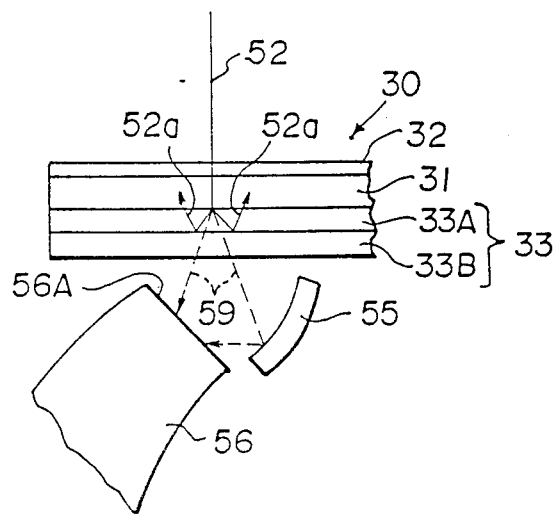
FIG. 11 is an enlarged side view showing the major part of the third embodiment.
Figure 10:
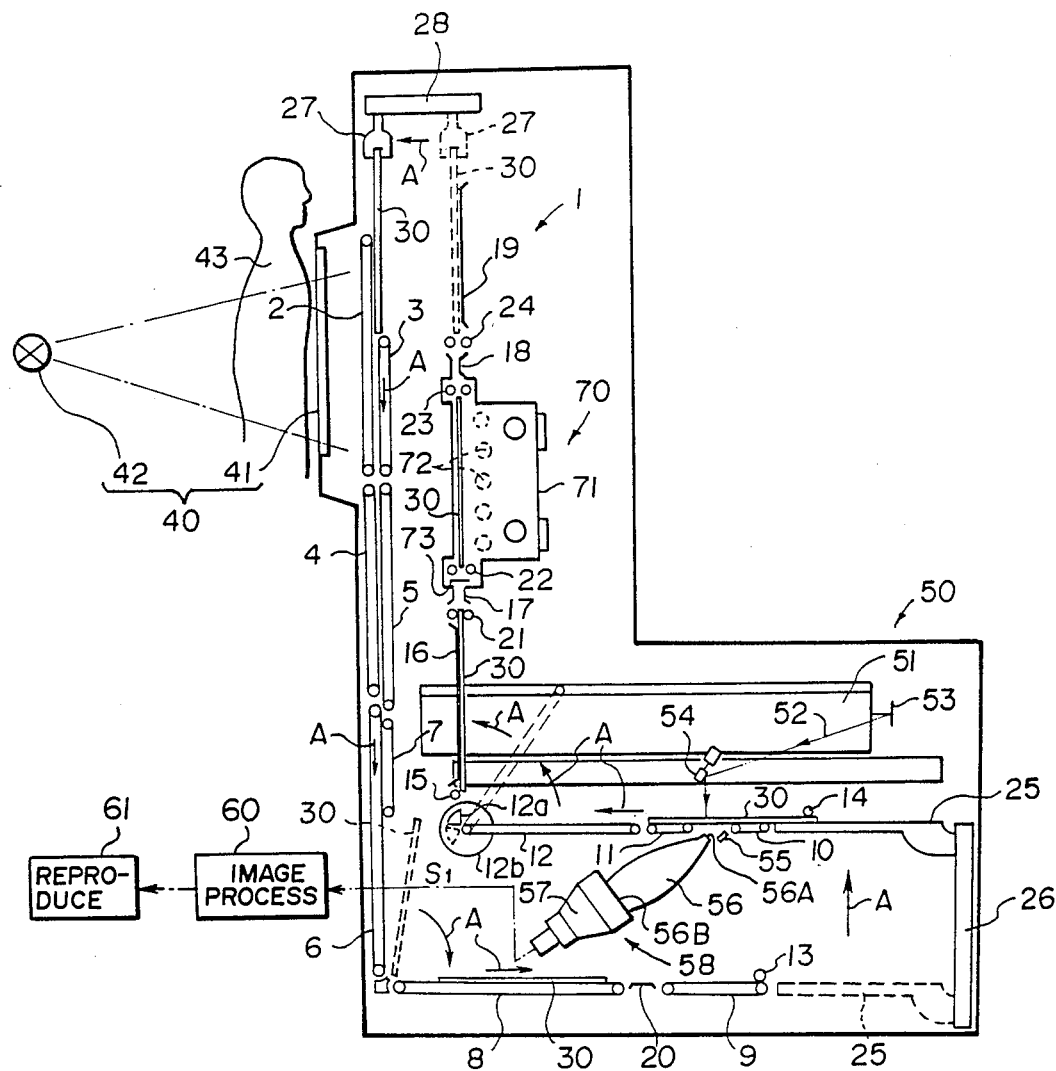
FIG. 10 is a schematic perspective view showing a third embodiment of the radiation image read-out apparatus in accordance with the present invention.

FIGS. 10 and 11 show the third embodiment of the radiation image read-out apparatus, i.e. the radiation image recording and read-out apparatus, in accordance with the present invention. As shown in FIG. 10, in the radiation image recording and read-out apparatus, a circulation path 1 is constituted by a sheet circulation and conveyance means composed of endless belts 2, 3, 4, 5, 6, 7, 8, 9, 10, 11 and 12, guide rollers 13, 14 and 15, guide plates 16, 17, 18, 19 and 20, nip rollers 21, 22, 23 and 24, and a sheet movement means including the endless belt 12 as described later. A plurality of (by way of example, five) stimulable phosphor sheets 30, 30, . . . are positioned in spaced relation to each other on the circulation path 1 and are conveyed in the direction as indicated by the arrow A by the sheet circulation and conveyance means.

The endless belts 2 and 3 are positioned to vertically hold the stimulable phosphor sheet 30 therebetween. An image recording section 40 is constituted by an image recording stand 41 positioned on the left side of the endless belts 2 and 3, and a radiation source 42, e.g. an X-ray source, spaced from the image recording stand 41 to face the endless belts 2 and 3. When a radiation image of an object 43 is recorded on the sheet 30, the sheet 30 is held between the endless belts 2 and 3 as shown, and the radiation source 42 is activated with the object 43 standing in front of the image recording stand 41. In this manner, the sheet 30 is exposed to a radiation passing through an object 43 to have a radiation image of the object 43 stored on the sheet 30.

When image recording is finished at the image recording section 40, the stimulable phosphor sheet 30 is conveyed downwardly by the endless belts 4, 5, 6 and 7. When the rear end portion (i.e. the upper end portion) of the sheet 30 leaves the endless belt 7, the sheet 30 is automatically rotated around its lower end portion as indicated by the broken line in FIG. 10, placed on the endless belt 8, and conveyed in the direction as indicated by the arrow A. The sheet 30 is further conveyed by the endless belt 9 and the guide roller 13 onto a vertically moveable plate 25 disposed at the position as indicated by the broken line in FIG. 10. The vertically moveable plate 25 is then moved up by a drive means (not shown) along a guide member 26 to the position as indicated by the solid line, and makes the sheet 30 contact the guide roller 14. As the guide roller 14 rotates, the sheet 30 is conveyed out of the vertically moveable plate 25 to the image read out section 50.

At the image read-out section 50, a laser beam source 51 is positioned above the endless belts 10 and 11 constituting a part of the image read-out section 50, and a mirror 53 and a galvanometer mirror 54 are disposed for scanning a laser beam 52 emitted by the laser beam source 51 in the width direction of the sheet 30 placed on the endless belts 10 and 11. The galvanometer mirror 54 is swung in both ways to scan the laser beam 52 in the main scanning direction on the sheet 30 carrying the radiation image stored thereon. A photoelectric read-out means 58 composed of the light guide member 56 and the photomultiplier 57 is disposed at the position below the sheet 30 conveyed to the image read-out section 50 and approximately facing the scanning position of the laser beam 52.

When the sheet 30 is exposed to the laser beam 52, the sheet 30 emits light in proportion to the stored radiation energy. The light emitted by the lower surface side of sheet 30 is photoelectrically detected by the photoelectric read-out means 58. The light guide member 56 is fabricated by forming of a light guiding material such as an acrylic sheet, and has a linear light input face 56A disposed to extend along the beam scanning line on the sheet 30, and a ring-shaped light output face 56B closely contacted with the light receiving face of the photomultiplier 57. The light entering the light guide member 56 from its light input face 56A is guided inside of the light guide member 56 through total reflection to the light output face 56B thereof, and detected by the photomultiplier 57. Thus the amount of the light emitted by the sheet 30 and carrying the radiation image information is detected by the photomultiplier 57. A light guiding reflection mirror 55 is disposed in the vicinity of the light input face 56A of the light guide member 56, and efficiently reflects the light, which is emitted toward the mirror 55, to the light guide member 56. Simultaneously with the scanning of the sheet 30 by the laser beam 52 in the main scanning direction, the sheet 30 is moved by the endless belts 10 and 11 in the subscanning direction as indicated by the arrow A approximately normal to the main scanning direction, so that the radiation image is read out over the whole surface of the sheet 30. The electric image signal S1 generated by the photomultiplier 57 is sent to an image processing circuit 60 for processing the electric image signal S1. The image signal S1 thus processed is then sent to an image reproducing apparatus 61. The image reproducing apparatus 61 may be a display device such as a cathode ray tube (CRT), or a device for recording a visible image by point-by-point scanning on a photographic film. Or, the image signal may be stored on a storage means such as a magnetic tape (not shown).

After image read-out is finished, the stimulable phosphor sheet 30 is moved onto the endless belt 12. When the leading end portion of the sheet 30 contacts a stopper 12a disposed at the left end of the endless belt 12, the endless belt 12 is rotated by a motor 12b integrally with the stopper 12a in the direction as indicated by the arrow A. When the endless belt 12 has been rotated by approximately 90°, the sheet 30 is grasped between the guide plate 16 and the endless belt 12, conveyed upward by the endless belt 12 and the roller 15, and sent to the erasing section 70 via the nip rollers 21, the guide plate 17, and the nip rollers 22. The erasing section 70 is composed of a case 71 and many erasing light sources 72, 72, . . . , constituted by fluorescent lamps, arranged inside of the case 71. After a shutter 73 is opened, the sheet 30 is conveyed into the case 71 by the nip rollers 22. Thereafter, the shutter 73 is closed, and the erasing light sources 72, 72, . . . are turned on. The erasing light sources 72, 72, . . . mainly emit light having a wavelength within the stimulation wavelength range for the stimulable phosphor constituting the sheet 30. When the sheet 30 is exposed to the erasing light, the radiation energy remaining on the sheet 30 after the image read-out is conducted is released. At this time, since the shutter 73 is closed, no erasing light leaks into the image read out section 50 and accordingly no noise is generated in the read-out image signal.

After the radiation energy remaining on the stimulable phosphor sheet 30 is erased to such an extent that another image recording on the sheet 30 is possible, the nip rollers 23 are rotated and the sheet 30 is conveyed out of the erasing section 70. Then, the sheet 30 is sent via the guide plate 18 to the nip rollers 24, conveyed by the nip rollers 24 along the guide plate 19, and grasped by a sheet grasping means 27 which constitutes a part of the sheet movement means and which is disposed at the position as indicated by the broken line above the guide plate 19. The sheet grasping means 27 is moved by a drive means (not shown) in the direction as indicated by the arrow A along a guide member 28, and releases the sheet 30 at the position as indicated by the solid line. The sheet 30 is then conveyed downwardly by the endless belts 2 and 3 to the image recording position, and reused for image recording.

The image read-out in the third embodiment will be described in more detail with reference to FIG. 11 which is an enlarged view showing the major part of the image read-out section 50. As shown in FIG. 11, the stimulable phosphor sheet 30 is composed of a stimulable phosphor layer 31, a transparent protective layer 32 overlaid on the overall surface on one side of the stimulable phosphor layer 31, and a multi-layer optical filter 33 formed on the whole surface on the other side of the stimulable phosphor layer 31. The multi-layer optical filter 33 comprises a transparent glass support 33B, and a multi-layer film 33A formed on the surface of the glass support 33B. The stimulable phosphor sheet 30 is disposed in the apparatus so that the multi-layer optical filter 33 faces the light guide member 56 at the image read-out section 50. Therefore, at the image read-out section 50, the light 59 emitted by the stimulable phosphor layer 31 emanates toward the light guide member 56 via the multi-layer optical filter 33.

By way of example, the multi-layer optical filter 33 used in the third embodiment is of the same type as the multi-layer optical filter used in the aforesaid first and second embodiments, and exhibits the spectral transmittance characteristics as shown in FIG. 3. In this embodiment, as in the first and second embodiments, a beam having a wavelength of 633 nm emitted by a He-Ne laser is used as the laser beam 52 acting as stimulating rays, and the stimulable phosphor layer 31 is of the type emitting the light 59 having a wavelength within the range of 360 nm to 420 nm (mainly a wavelength of 390 nm) upon stimulation by said laser beam 52. Therefore, since the stimulable phosphor sheet provided with the multi-layer optical filter is used, the same effects as in the aforesaid first and second embodiments can be achieved. Specifically, with the third embodiment, it is possible to increase the amount of the light emitted by the stimulable phosphor layer by efficiently utilizing the laser beam as stimulating rays without adversely affecting detection of the emitted light, thereby markedly increasing the sensitivity of the read-out apparatus as compared with the conventional apparatus.

For example, experiments conducted by the inventors revealed that, when the efficiency of utilization of stimulating rays is increased by use of the stimulable phosphor sheet provided with the multi-layer optical filter as in the third embodiment, it is possible to increase the read-out sensitivity by approximately two times the sensitivity obtained by use of a sheet provided with no multi-layer optical filter.

The multi-layer optical filter used in the third embodiment exhibits such very preferable characteristics that it transmits nearly 80% of the light emitted by the stimulable phosphor sheet and impinging upon the multi-layer optical filter and reflects approximately 90% of stimulating rays. In general, as mentioned with reference to the first and second embodiments, the desirable effects of increasing the sensitivity can be achieved in the case where the stimulating ray reflectivity is not lower than 60%, and the transmittance with respect to the light emitted by the stimulable phosphor sheet is not lower than 60%. As the support for supporting the multi-layer film, besides the aforesaid glass support, it is also possible to use a transparent plastic material sheet formed of polyethylene terephthalate, polyethylene, polyvinylidene chloride, polyamide, or the like. Also, the protective layer 32 need not necessarily be provided on the stimulable phosphor layer 31, and the stimulable phosphor sheet 30 may be composed only of the stimulable phosphor layer and the multi-layer optical filter.

Also, in the third embodiment, instead of forming the multi-layer optical filter 33 integrally with the stimulable phosphor sheet 30 on the whole surface thereof on the side of the light guide member 56, the multi-layer optical filter 33 may be formed independently of the stimulable phosphor sheet 30 and disposed to contact the sheet 30 or may be disposed at an intermediate position between the sheet 30 and the light guide member 56 in slightly spaced relation to the sheet 30 and the light guide member 56. In this case, the multi-layer optical filter 33 need not necessarily cover the overall surface of the stimulable phosphor sheet 30, and may have a size capable of covering the light input face 56A of the light guide member 56 and the light guiding reflection mirror 55.

Fourth to eighth embodiments of the radiation image read-out apparatus, i.e. the radiation image recording and read-out apparatus, in accordance with the present invention wherein the multi-layer optical filter substantially reflecting stimulating rays and substantially transmitting light emitted by the stimulable phosphor sheet is applied to the built-in type apparatus II will be described hereinbelow.

Figure 12:
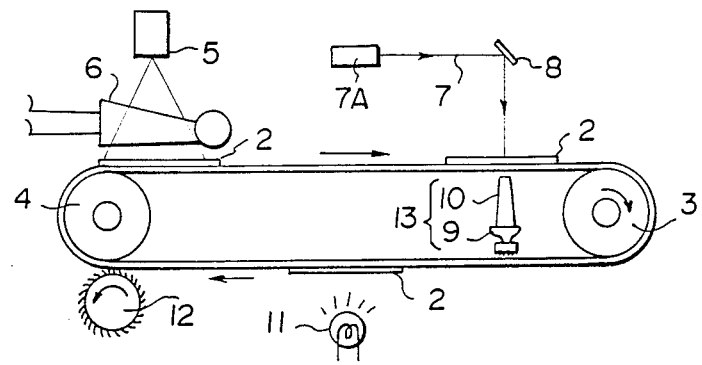
FIG. 12 is a schematic perspective view showing a fourth embodiment of the radiation image read out apparatus in accordance with the present invention.

FIG. 12 shows the fourth embodiment of the radiation image read-out apparatus in accordance with the present invention. In FIG. 12, a transparent endless conveyor 1, e.g. a belt conveyor or a chain conveyor, is used as the supporting material for supporting stimulable phosphor sheets 2, 2, 2. The stimulable phosphor sheets 2, 2, 2 are fixed in equally spaced relation on the conveyor 1. The conveyor 1 provided with the stimulable phosphor sheets 2, 2, 2 is engaged with a driving roller 3 and a driven roller 4, and moved in the direction as indicated by the arrow by the driving roller 3 which is rotated by a drive unit (not shown). In the vicinity of the driven roller 4 is disposed a radiation source 5 to face the conveyor 1. The radiation source 5 may be an X-ray source or the like, and projects a radiation image of an object 6 positioned between the stimulable phosphor sheet 2 and the radiation source 5 onto the sheet 2. A stimulating ray source 7A for emitting stimulating rays 7 such as a laser beam, and a light deflector 8 constituted by a galvanometer mirror or the like for deflecting the stimulating rays 7 emitted by the stimulating ray source 7A in the width direction of the conveyor 1, i.e. in the direction normal to the drawing sheet in FIG. 12, are disposed in the vicinity of the driving roller 3 and above the conveyor 1. When the stimulable phosphor sheet 2 is exposed to the stimulating rays 7, the exposed portion of the sheet 2 emits light in proportion to the stored radiation energy. The light emitted from the lower surface side of the stimulable phosphor sheet 2 is photoelectrically detected by a photoelectric read-out means 13 disposed at a position inward of the movement path of the conveyor 1 and approximately facing the scanning position of the stimulating rays 7 via the conveyor 1. The photoelectric read-out means 13 may be composed of a photodetector 9 constituted by a head-on type photomultiplier, a photoelectric amplification channel plate or the like, and a light guide member 10 for guiding the light emitted by the sheet 2 to the photodetector 9. An erasing light source 11 is disposed facing the conveyor 1 on the side opposite to the radiation source 5 and the stimulating ray source 7A. The erasing light source 11 emits light having a wavelength within the stimulation wavelength range of the stimulable phosphor sheet 2 irradiated onto the sheet 2 to cause it to release the radiation energy stored thereon. The erasing light source 11 may be constituted by, e.g., a tungsten-filament lamp, a halogen lamp, an infrared lamp, or a laser source as disclosed in U.S. Pat. No. 4,400,619. Since the radiation energy stored on the sheet 2 can also be eliminated by heating them as disclosed in, for example, Japanese Unexamined Patent Publication No. 56(1981)-12599, the erasing light source 11 may be replaced by a heating means. A cylindrical cleaning roller 12 is opposed to the driven roller 4 with the conveyor 1 intervening therebetween. The cleaning roller 12 is rotated counterclockwise in the drawing by a drive unit (not shown), and removes dust from the surface of the sheet 2 moving in contact with the cleaning roller 12. If necessary, the cleaning roller 12 may be of an electrostatic attraction type which collects dust and the like by an electrostatic force.

The light guide member 10 may be of a material and a construction as disclosed in U.S. Pat. Nos. 4,346,265 and 4,369,367, U.S. patent application Ser. No. 168,805, and Japanese Unexamined Patent Publication No. 56(1981)-11395, and may be used by the method disclosed therein.

The fourth embodiment shown in FIG. 12 is operated as described below. The conveyor 1 is intermittently moved by the distance corresponding to one-third of the entire circumference thereof at a time by the driving roller 3. The stopping position of the conveyor 1 is adjusted so that one stimulable phosphor sheet 2 faces the radiation source 5 when the conveyor 1 stops. When the conveyor 1 is stopped, the radiation source 5 is turned on to cause the sheet 2 facing the radiation source 5 to store the radiation image of the object 6. After the radiation image is recorded on the sheet 2, the conveyor 1 is further moved by the distance of one-third the conveyor circumference and stopped. At this time, the sheet 2 carrying the radiation image stored thereon is stopped in the position facing the light deflector 8 and the photodetector 9, and scanned with the stimulating rays 7 emitted by the stimulating ray source 7A. Scanning is conducted in the width direction of the conveyor 1 (main scanning) by the light deflector 8, and also in the length direction of the conveyor 1 (sub-scanning) by the movement of a stage (not shown) carrying the stimulating ray source 7A, the light deflector 8, the photodetector 9 and the light guide member 10 in the length direction of the conveyor 1. The stage can be easily formed by use of a known linear movement mechanism. Upon exposure to the stimulating rays 7, the sheet 2 emits light 20 in proportion to the stored radiation energy. Of the emitted light, the light emitted from the lower surface side of the sheet 2 passes through the transparent conveyor 1, and enters the photodetector 9 via the light guide member 10. An electric signal corresponding to the radiation image stored on the sheet 2 is generated by the photodetector 9. After the radiation image is read out in this manner, the conveyor 1 is further moved by the distance of one-third the circumference thereof and stopped. In this condition, the sheet 2 from which the radiation image has been read out is opposed to the erasing light source 11, and exposed to the erasing light emitted thereby to eliminate the radiation energy of the radiation image remaining on the sheet 2 after the read-out step, the radiation emitted by radioactive isotopes such as Ra266 and K40 existing in trace amounts in the stimulable phosphor, and environmental radiations stored in the stimulable phosphor. In this manner, the sheet 2 is recovered to the condition reusable for further image recording. Thereafter, the conveyor 1 is moved by the distance of one-third the conveyor circumference until the erased sheet 2 faces the radiation source 5. Midway during this movement, dust on the surface of the sheet 2 is removed by the cleaning roller 12. The sheet 2 free from any radiation energy and dust is reused to record a radiation image at the radiation source 5.

As mentioned above, the stimulable phosphor sheets 2, 2, 2 are circulated and reused through the erasing step conducted by the erasing light source 11 and the cleaning step effected by the cleaning roller 12. One sheet 2 passes through the image recording, image read-out and image erasing steps while the conveyor 1 rotates one turn. It is, of course, possible to simultaneously conduct these three steps for the three sheets 2, 2, 2 respectively, when the conveyor 1 is stopped. In this case, it is possible to improve the image processing speed.

In the fourth embodiment of FIG. 12, since the sheets 2, 2, 2 are fixed on the endless conveyor 1 and reused through the circulation of the conveyor 1, there is no risk of the stimulable phosphor being damaged unlike the method in which independent sheets are conveyed one by one. Further, since the mechanism for circulating the sheets 2, 2, 2 can be formed of a simple conveyor mechanism, the apparatus is easy to design and manufacture. Also, since the three sheets 2, 2, 2 are always used in the predetermined sequence, the quality of the reproduced images does not fluctuate among the sheets 2, 2, 2.

The electric image signal generated by the photodetector 9 may immediately be sent to a reproducing apparatus to reproduce the radiation image as a hard copy or display it on a CRT, or may be digitized and temporarily stored on a high-density recording medium such as a magnetic tape, a magnetic disk or an optical disk to later reproduce the radiation image therefrom. When the apparatus is loaded on a traveling X-ray diagnostic station or the like for obtaining radiation images for medical diagnosis, it is possible to reduce the number of equipment to be loaded on the traveling station by conducting the read-out and storing of the electric image signals on the high-density recording medium at the site of recording and read-out operation, and bringing the recording medium to a medical center or the like for reproducing the radiation images. The electric image signals may also be simultaneously sent to the reproducing apparatus and the recording medium. Namely, when the read-out apparatus is used in a hospital, the electric image signals may be transferred from the recording and read-out station to the recording medium for storage station where the image signals are temporarily stored on a recording medium and, at the same time, they may be transferred to the reproducing apparatus, e.g. a CRT, in the diagnostic room in order to immediately use them for diagnosis.

It is possible and preferable for obtaining a radiation image having an improved image quality, particularly a high diagnostic efficiency and accuracy, to process the electric image signal in order to intensify the image and change the contrast. In the present invention, it is preferable to conduct the frequency processing as disclosed in U.S. Pat. Nos. 4,315,318, 4,346,295 or 4,387,428, or European Patent Publication No. 31, 952, and/or the gradation processing as disclosed in U.S. Pat. Nos. 4,302,672, 4,276,473 or 4,310,886.

Figure 13:
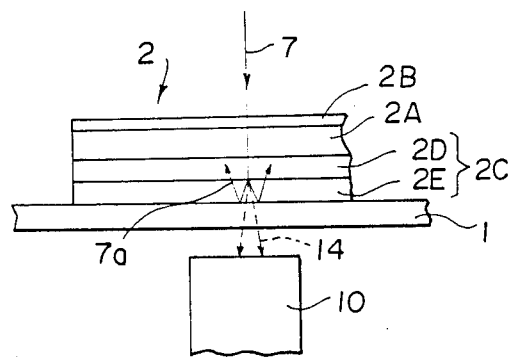
FIG. 13 is an enlarged side view showing the major part of the fourth embodiment.

In the fourth embodiment of FIG. 12, the sub-scanning of the stimulable phosphor sheet 2 is conducted by moving the stimulating ray source and the read-out system with respect to the stationary sheet 2. However, it is also possible to maintain the stimulating ray source and the read-out system stationary, and move the sheet 2 to conduct the sub-scanning. In order to move the sheets 2, 2, 2 for this purpose, it is possible to mount the sheets 2, 2, 2 on the conveyor 1 via a stage, instead of directly fixing them thereon, move the stage on the conveyor 1 when the conveyor 1 is being halted to read out the radiation image, and return the stage to a predetermined position after the readout is over. Alternatively, the sheets 2, 2, 2 may be directly mounted on the conveyor 1, and the sub-scanning may be conducted by moving the conveyor 1. In the latter case, the distance between the image recording section and the image read-out section may be made different from the intervals between the adjacent sheets 2, 2, and after the conveyor 1 has been moved to scan one sheet 2 in the sub-scanning direction, the conveyor 1 may be moved to a position to locate the next sheet 2 at the image recording section. In this case, the image recording and the image read-out are not conducted at the same time. Further, in order to speed up the recording and read-out operation by carrying out the image recording and the image read-out in parallel with each other, it is possible to move the conveyor 1 to scan one sheet 2 in the sub-scanning direction while a radiation image is being recorded on the next sheet 2, which is being moved together with the conveyor 1, by use of the slit exposure method. It is also possible to use several conveyors that can automatically transfer the sheets therebetween, and operate the conveyors in such a manner that the sheets are ultimately circulated via these conveyors. In this case, when the read-out speed is extremely lower than the recording speed, it becomes possible to increase the read-out speed by installing a plurality of image read-out sections for one image recording section, connecting the conveyors branched from the image recording section to the respective image read-out sections, and supplying the sheets to the respective image read-out sections. Further, when the sheets are transferred among a plurality of conveyors as mentioned above, it is possible to connect two conveyors via one stage for temporarily storing the sheets. This connection method is convenient since deteriorated stimulable phosphor sheets can be removed from the apparatus or new sheets can be added thereto by use of this stage without stopping the system. Also, when a plurality of the conveyors are provided, only the conveyor at the position where image read-out is carried out may be made transparent The image read-out will be described in more detail with reference to FIG. 13 which is an enlarged view showing the major part of the image read-out zone in the fourth embodiment of FIG. 12. As shown in FIG. 13, the stimulable phosphor sheet 2 is composed of a stimulable phosphor layer 2A, a transparent protective layer 2B overlaid on the overall surface on one side of the stimulable phosphor layer 2A, and a multi-layer optical filter 2C formed on the whole surface on the other side of the stimulable phosphor layer 2A. The multi-layer optical filter 2C comprises a support 2E constituted by a transparent plastic sheet formed of polyethylene terephthalate, polyethylene, polyvinylidene chloride, polyamide or the like, and a multi-layer film 2D formed on the surface of the support 2E. The stimulable phosphor sheet 2 is secured on the conveyor 1 with the multi-layer optical filter 2C contacting the conveyor 1. Therefore, at the image read-out zone, the light 14 emitted by the stimulable phosphor layer 2A emanates toward the light guide member 10 via the multi-layer optical filter 2C.

By way of example, the multi-layer optical filter 2C used in the fourth embodiment is a dichroic filter of the same type as the multi-layer optical filter used in the aforesaid first, second and third embodiments, and exhibits the spectral transmittance characteristics as shown in FIG. 3. Also in this embodiment, a beam having a wavelength of 633 nm emitted by a He-Ne laser is used as the stimulating rays 7, and the stimulable phosphor layer 2A is of the type emitting the light 14 having a wavelength within the range of 360 nm to 420 nm (mainly a wavelength of 390 nm) upon stimulation by said stimulating rays 7.

The stimulating rays 7 are made to impinge upon the stimulable phosphor sheet 2 as mentioned above, and stimulate the stimulable phosphor layer 2A. A part 7a of the stimulating rays 7 passes through the stimulable phosphor layer 2A without stimulating it. The part 7a of the stimulating rays 7 thus passing through the stimulable phosphor layer 2A is reflected with a high reflectivity by the multi-layer optical filter 2C exhibiting the characteristics as shown in FIG. 3 to the stimulable phosphor layer 2A, and stimulates the stimulable phosphor layer 2A. Thus, in this embodiment, the stimulating rays 7 are confined between the multi-layer optical filter 2C and the stimulable phosphor layer 2A in the stimulable phosphor sheet 2, and are efficiently utilized for stimulating the stimulable phosphor layer 2A.

Though also the light 14 emitted by the stimulable phosphor layer 2A impinges upon the multi-layer optical filter 2C, the multi-layer optical filter 2C substantially transmits the emitted light 14 as shown in FIG. 3. Therefore, the emitted light is efficiently guided by the light guide member 10. Thus with this embodiment, since the stimulable phosphor sheet provided with the multi-layer optical filter is used, it is possible to increase the amount of the light emitted by the stimulable phosphor layer by efficiently utilizing the stimulating rays without adversely affecting detection of the emitted light, thereby markedly increasing the sensitivity of the read-out apparatus as compared with the conventional apparatus.

For example, experiments conducted by the inventors revealed that, when the efficiency of utilization of stimulating rays is increased by use of the stimulable phosphor sheet provided with the multi-layer optical filter as in the third embodiment, it is possible to increase the read-out sensitivity by approximately two times the sensitivity obtained by use of a sheet provided with no multi-layer optical filter.

The multi-layer optical filter used in the fourth embodiment exhibits such very preferable characteristics that it transmits nearly 80% of the light emitted by the stimulable phosphor layer and impinging upon the multi-layer 10 optical filter and reflects approximately 90% of stimulating rays. In general, as mentioned with reference to the first, second and third embodiments, the desirable effects of increasing the sensitivity can be achieved in the case where the stimulating ray reflectivity is not lower than 60%, and the transmittance with respect to the light emitted by the stimulable phosphor layer is not lower than 60%. Also, the protective layer 2B need not necessarily be provided on the stimulable phosphor layer 2A, and the stimulable phosphor sheet 2 may be composed only of the stimulable phosphor layer and the multi-layer optical filter.

In fifth and sixth embodiments of the built-in type apparatus II described below with reference to FIGS. 14, 15A and 15B, instead of a transparent plastic sheet, a glass plate may be used as the support for the multi-layer optical filter.

In the fourth embodiment mentioned above, since the stimulable phosphor sheets 2 are fixed on the conveyor 1 in engagement with the rollers 3 and 4, the sheets 2 must be flexible. However, from the viewpoints of durability of the stimulable phosphor and formation of radiation images of high quality, it is desirable to avoid bending of the sheets. FIG. 14 and FIGS. 15A and 15B show the fifth and sixth embodiments in which the stimulable phosphor sheets are fixed on rigid transparent supporting materials formed to circulate the sheets without bending them. Also in these embodiments, each of the stimulable phosphor sheets is provided with a multi-layer optical filter of the same type as in the fourth embodiment.

Figure 14:
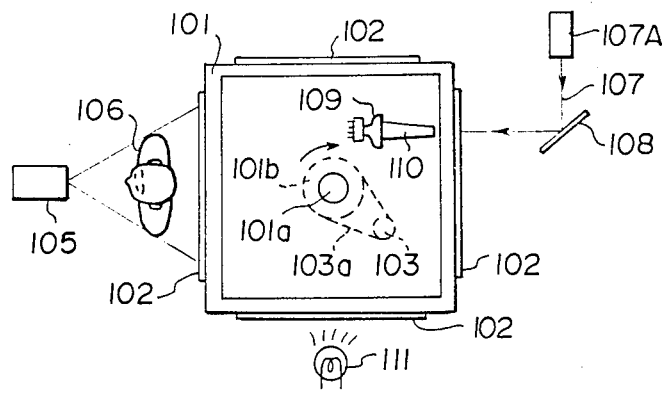
FIG. 14 is a schematic view showing a fifth embodiment of the radiation image read-out apparatus in accordance with the present invention.
Figure 15A:
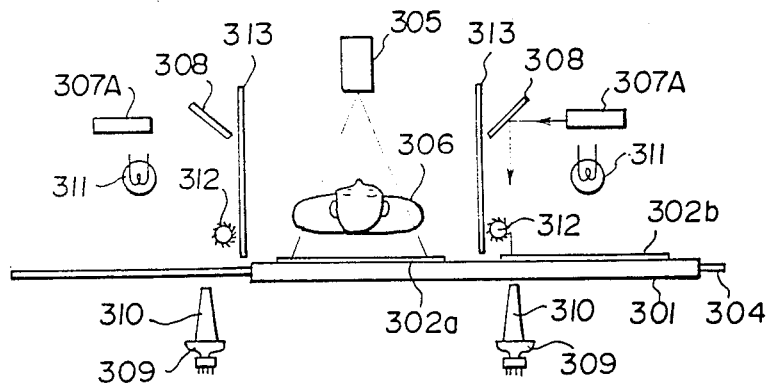
FIGS. 15A and 15B are schematic views showing a sixth embodiment of the radiation image read-out apparatus in accordance with the present invention.
Figure 15B:
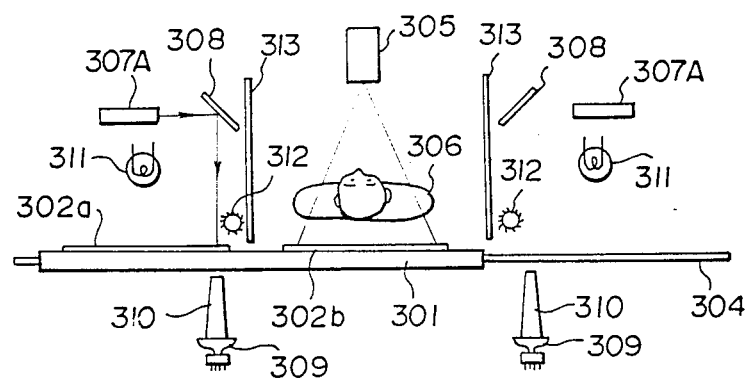

In the fifth embodiment shown in FIG. 14, stimulable phosphor sheets 102, 102, . . . (by way of example, four stimulable phosphor sheets) provided with the multi-layer optical filter are fixed on the transparent side faces of a quadrangular prism like turret 101. The turret 101 is provided with a shaft 101a on which a rotation member 101b such as a sprocket wheel is fixed. The rotation member 101b receives the driving force of a drive unit 103 via a driving force transfer member 103a formed of a chain or the like. The turret 101 is rotated at 90° intervals in the direction of the arrow by the drive unit 103A. A radiation source 105 is disposed to stand facing one side face of the turret 101, and a stimulating ray source 107A and a light deflector 108 are disposed in the vicinity of the side opposite to the aforesaid side face. A photodetector 109 and a light guide member 110 are disposed at the position facing the scanning position of stimulating rays via the turret side face. An erasing light source 111 is disposed facing the side face of the turret 101 adjacent to the aforesaid side face at the radiation source 105 on the side upstream of turret rotation from the aforesaid side face. The radiation source 105, the stimulating ray source 107A and the other parts disposed around the turret 101 may be of the same types as those used in the fourth embodiment of FIG. 12, and the means for supporting and circulating the sheets employed in the apparatus of FIG. 14 differs from that in FIG. 12. In the same manner as in FIG. 12, when the turret 101 is stopped, the radiation source 105 is turned on to have the sheet 102 store a radiation image of an object 106. After the turret 101 is rotated 90° twice, the sheet 102 carrying the radiation image stored thereon is stopped at the position facing the light deflector 108, the photodetector 109 and the like, and scanned with the stimulating rays 107 emitted by the stimulating ray source 107A to have the sheet 102 emit light upon stimulation thereof. By the effects of the multi-layer optical filter formed on the sheet 102, the stimulating rays 107 are utilized efficiently for stimulation of the sheet 102. The light emitted by the lower surface of the sheet 102 (the surface contacting the turret 101) is photoelectrically read out by the photodetector 109, which outputs an electric image signal corresponding to the radiation image. In the fifth embodiment of FIG. 14, since it is difficult to conduct the sub-scanning of the stimulating rays by the rotation of the turret 101, the other sub-scanning methods as mentioned above are employed. After the radiation image is read out from the sheet 102, the turret 101 is rotated 90° to dispose the sheet 102 at the erasing light source 111, where the radiation energy remaining on the sheet 102 is erased for making it reusable.

In FIG. 14, the stimulable phosphor sheet 102 is free of any process at one of the four stages of the turret 101. The process-free stage is not limited to the position shown in FIG. 14. Accordingly, it is also possible to form the apparatus in which three stimulable phosphor sheets are fixed on a triangular prism-like turret. When it takes a long time to conduct the erasing step, two erasing stages may be provided.

The number of stimulable phosphor sheets fixed on the supporting material is not limited to three as in the fourth embodiment and four as in the fifth embodiment, and the erasing zone need not necessarily be disposed independently of the zone for conducting the image recording or the image read-out. For example, image recording, image read-out and erasing may be carried out sequentially at the same position by selectively and sequentially disposing one of the radiation source, a set of the stimulating ray source and the light deflector, and the erasing light source at the same position on one side of the stimulable phosphor sheet, disposing the light detection means on the other side of the stimulable phosphor sheet, and activating the light detection means only at the time of image read-out.

In the fifth embodiment, a means for cleaning the stimulable phosphor sheets, such as the cleaning roller 12 used in the fourth embodiment, is not provided. However, if necessary, it is possible to use a self-traveling type cleaning roller which moves to clean the surfaces of the stimulable phosphor sheets after the erasing step.

In the just mentioned two embodiments of the built-in type apparatus II, instead of rotating the sheet supporting material as mentioned above, it may be moved in any other manners, for example, may be linearly reciprocated. In the sixth embodiment shown in FIGS. 15A and 15B, a plate-like supporting material 301 is placed on a rail 304 for reciprocation therealong by use of a drive unit (not shown) for driving, for example, a pinion gear which is engaged with with a rack on the side of the rail 304 to form a rack-pinion mechanism. Two stimulable phosphor sheets 302a and 302b are fixed on the supporting material 301. A radiation source 305 is disposed on the side facing the center of the rail 304, where the sheet 302a is positioned in the drawing. The image read-out sections comprising a stimulating ray source 307A, a light deflector 308, a photodetector 309 and a light guide member 310 are positioned on both sides of the radiation source 305. Each image read-out section is also provided with an erasing light source 311, and isolated from the radiation source 305 by a light shielding plate 313. Cleaning rollers 312 are disposed in the exteriors of and near to the light shielding plates 313. The supporting material 301 is reciprocated on the rail 304, and alternately positioned as shown in FIGS. 15A and 15B. When the supporting material 301 is set in the position shown in FIG. 15A, a radiation image is recorded on the left sheet 302a, and the image read-out is conducted for the right sheet 302b. The sub-scanning in the image read-out step may be effected by moving the stimulating ray source and the read-out system or by moving the supporting material 301 as mentioned above. After the image read-out is finished, the erasing light source 311 is turned on for a predetermined time to erase the residual radiation energy on the sheet 302b. At this time, since the light emitted by the erasing light source 311 is shielded by the light shielding plate 313, the radiation image stored on the sheet 302a is not adversely affected by the erasing light. After the erasing step for the sheet 302b is finished, the supporting material 301 is moved to left. At this time, the cleaning roller 312 is moved from the retracting position shown in the drawing to the position contacting the sheet 302a, and cleans the surface of the sheet 302b being moved to left. After the sheet 302b has passed through the cleaning roller 312, the cleaning roller 312 is returned to the retracting position. After the supporting material 301 is moved to the position shown in FIG. 15B, the radiation image stored on the left sheet 302a in the condition shown in FIG. 15A is read out, and the image recording is conducted for the erased and cleaned right sheet 302b. Thereafter, the supporting material 301 is returned to the position shown in FIG. 15A while the erasing and cleaning are effected for the left sheet 302a to make it reusable. When it is not necessary to increase the speed of the apparatus, only one stimulable phosphor sheet may be used, and the image recording and the image read-out may be conducted alternately.

In order to obtain a radiation image having an improved image quality, particularly a high diagnostic efficiency and accuracy, it is preferable to investigate the recording condition or the recording pattern of the radiation image stored on the stimulable phosphor sheets before conducting the read-out, and adjust the read-out gain of the photoelectric read-out means, the scale factor, and/or the signal processing conditions based on the recording condition or pattern. For this purpose, it has been proposed in, for example, U.S. patent application Ser. No. 434,886 or European Patent Appln. Serial No. 82305530.6, to read out the pattern of the radiation image in advance by use of stimulating rays of low energy (this operation is referred to as the preliminary read-out), and then to adjust the read-out condition and conduct the read-out for obtaining a radiation image for viewing, particularly for diagnostic purposes (this operation is referred to as the final read-out). In the present invention, the preliminary read-out may be conducted by disposing the preliminary read-out section on the side upstream from the aforesaid image read-out section, or by using the aforesaid image read-out section both for preliminary read-out and for final read-out.

In built-in type apparatus II described above with reference to the fourth, fifth and sixth embodiments, at least one stimulable phosphor sheet is fixed on the transparent supporting material. However, it is also possible to constitute the transparent supporting material as an endless supporting material, and form a stimulable phosphor layer thereon via a multi-layer optical filter. For example, the multi-layer optical filter and the stimulable phosphor layer may be formed on the surface of an endless belt or a rotatable drum. Seventh and eighth embodiments having such a configuration will be described below with reference to FIGS. 16 and 17.

Figure 16:
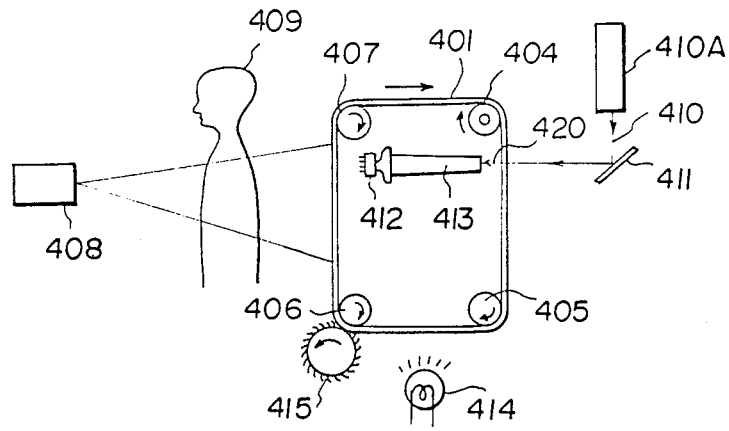
FIG. 16 is a schematic view showing a seventh embodiment of the radiation image read-out apparatus in accordance with the present invention.

In FIG. 16 showing the seventh embodiment, an endless belt-like recording member 401 is used. The recording member 401 is composed of a transparent, flexible endless belt-like supporting material, the aforesaid multi-layer optical filter formed on the surface of the supporting material, and a stimulable phosphor layer overlaid on the multi-layer optical filter. The recording member 401 is applied on a cylindrical driving roller 404 and cylindrical driven rollers 405, 406 and 407, and is moved in the direction as indicated by the arrow by the driving roller 404 which is rotated by a drive unit (not shown). A radiation source 408 is disposed on the side facing the portion of the recording member 401 between the driven rollers 406 and 407 from outside said portion. The radiation source 408 may be an X-ray source or the like, and projects a radiation image of an object 409 positioned between the radiation source 408 and the portion of the recording member 401 between the driven rollers 406 and 407 onto the recording member 401. A stimulating ray source 410A for emitting stimulating rays 410 such as a laser beam, and a light deflector 411 constituted by a galvanometer mirror or the like for deflecting the stimulating rays 410 emitted by the stimulating ray source 410A in the width direction of the recording member 401 are disposed to face the portion of the recording member 401 between the driving roller 404 and the driven roller 405 from outside said portion. Also, a photodetector 412 for reading out the light 420 emitted by the stimulable phosphor layer upon stimulation thereof by the stimulating rays 410 is disposed to face the portion of the recording member 401 between the driving roller 404 and the driven roller 405 from inside said portion. The photodetector 412 may be constituted by a head-on type photomultiplier, a photoelectric amplification channel plate or the like, and photoelectrically detects the light emitted by the stimulable phosphor layer upon stimulation thereof and guided by a light guide member 413. An erasing light source 414 is disposed to face the portion of the recording member 401 between the driven rollers 405 and 406 from outside said portion. The erasing light source 414 emits light having a wavelength within the stimulation wavelength range of the stimulable phosphor layer on the to stimulable phosphor layer to cause it to release the radiation energy stored thereon. The erasing light source 414 may be constituted by, e.g., a tungsten-filament lamp, a halogen lamp, an infrared lamp, or a laser source as disclosed in U.S. Pat. No. 4,400,619. Since the radiation energy stored on the stimulable phosphor layer can also be eliminated by heating it as disclosed in, for example, Japanese Unexamined Patent Publication No. 56(1981)-12599, the erasing light source 414 may be replaced by a heating means. A cylindrical cleaning roller 415 is opposed to the driven roller 406 with the recording member 401 intervening therebetween. The cleaning roller 415 is rotated counterclockwise in the drawing by a drive unit (not shown), and removes dust from the surfaces of the recording member 401 moving in contact with the cleaning roller 415. If necessary, the cleaning roller 415 may be of an electrostatic attraction type.

The light guide member 413 may be of the same type as the light guide member 10 shown in FIG. 12.

The seventh embodiment having the aforesaid configuration is operated as described below. The recording member 401 is intermittently moved by the distance corresponding to one-fourth of the entire circumference thereof at a time by the driving roller 404. When the recording member 401 is stopped, the radiation source 408 is turned on to cause the stimulable phosphor layer of the recording member 401 between the driven rollers 406 and 407 to store the radiation image of the object 409. After the recording member 401 is moved twice by the distance of one-fourth its circumference each time, the portion of the stimulable phosphor layer carrying the radiation image stored thereon is positioned between the driving roller 404 and the driven roller 405, and scanned with the stimulating rays 410 emitted by the stimulating ray source 410A. Scanning is conducted in the width direction of the recording member 401 (main scanning) by the light deflector 411, and also in the length direction of the recording member 401 (sub-scanning) by the movement of a stage (not shown) carrying the stimulating ray source 410A, the light deflector 411, the photodetector 412 and the light guide member 413 in the length direction of the recording member 401. The stage can be easily formed by use of a known linear movement mechanism. Upon exposure to the stimulating rays 410, the stimulable phosphor layer emits light in proportion to the stored radiation energy. Of the emitted light, light 420 emitted by the inner surface side of the stimulable phosphor layer is received by the photodetector 412 disposed inwardly of the conveyance path of the recording member 401 via the light guide member 413, and an electric signal corresponding to the radiation image stored on the stimulable phosphor layer is generated by the photodetector 412. After the radiation image is read out in this manner the recording member 401 is further moved by the distance of one-fourth the circumference thereof and stopped. In this condition, the portion of the stimulable phosphor layer from which the radiation image has been read out is positioned between the driven rollers 405 and 406, and exposed to the erasing light emitted by the erasing light source 44 to eliminate the radiation energy of the radiation image remaining on the stimulable phosphor layer after the read-out step, the radiation emitted by radioactive isotopes such as Ra266 and K40 existing in trace amounts in the stimulable phosphor, and environmental radiations stored in the stimulable phosphor. In this manner, the stimulable phosphor layer is recovered to the condition reusable for image recording.

Thereafter, the recording member 401 is moved until the erased portion of the stimulable phosphor layer is positioned between the driven rollers 406 and 407. Midway during this movement, dust on the surface of the recording member 401 is removed by the cleaning roller 415. The recording member 401 free from any radiation energy and dust is reused to record a radiation image at the radiation source 408.

As mentioned above, the recording member 401 is circulated and reused through the erasing step conducted by the erasing light source 414 and the cleaning step effected by the cleaning roller 415. A portion of the recording member 401 passes through the image recording, image readout and image erasing steps while the recording member 401 rotates one turn. It is, of course, possible to simultaneously conduct these three steps for the three different portions of the recording member 401, respectively, when the recording member 401 is stopped. In this case, it becomes possible to increase the image processing speed.

In the seventh embodiment, since the stimulable phosphor layer is fixed on the endless belt-like supporting material and reused through the circulation of the supporting material, there is no risk of the stimulable phosphor being damaged unlike the method wherein independent stimulable phosphor sheets are conveyed one by one. Further, since the mechanism for circulating the stimulable phosphor can be formed only of a simple endless belt drive mechanism, the apparatus is easy to design and manufacture. Also, since a single recording member 401 is circulated and reused, the quality of the reproduced visible images does not fluctuate.

In the same manner as in the fourth embodiment, the electric image signal generated by the photodetector 412 may immediately sent to a reproducing apparatus to reproduce the radiation image as a hard copy or display it on a CRT, or may be digitized and temporarily stored on a high-density recording medium such as a magnetic tape, a magnetic disk or an optical disk to later reproduce the radiation image therefrom.

In the seventh embodiment, the sub-scanning for reading out the radiation image is conducted by moving the stimulating ray source and the read-out system with respect to the recording member 401 when it is being halted. However, it is also possible to maintain the stimulating ray source and the read-out system stationary, and move the recording member 401 to conduct the sub-scanning. For this purpose, the recording member 401 may be moved at the sub-scanning speed after the image recording is over, and the read-out may be carried out during this movement of the recording member 401. It is also possible to conduct the image recording by use of the slit exposure method while the recording member 401 is being moved, thereby to effect the image recording an the image read-out without stopping the recording member 401.

Figure 17:
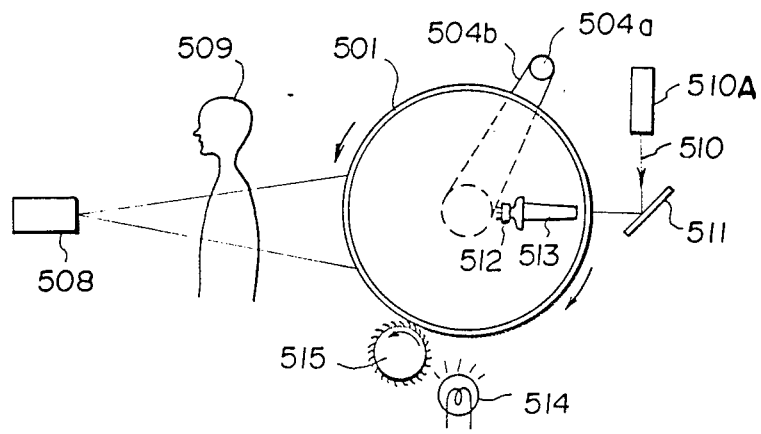
FIG. 17 is a schematic view showing an eighth embodiment of the radiation image read-out apparatus in accordance with the present invention.

In the seventh embodiment mentioned above, the endless belt-like recording member 401 which is flexible and can be bent freely is used. However, from the viewpoint of durability of the recording material and formation of fine radiation images, it is desirable that the recording material be rigid and is not bent during its use. FIG. 17 shows the eighth embodiment wherein a rigid recording material provided with the multi-layer optical filter is used. In the eighth embodiment of FIG. 17, a recording member 501 is composed of a transparent, drum-like supporting material, and a stimulable phosphor overlaid on the peripheral surface of the supporting material with the multi-layer optical filter of the same type as in the fourth embodiment intervening therebetween. To the recording member 501 is transferred the driving force of a driving shaft 504a of a drive unit (not shown) via a chain 504b, and the recording member 501 is intermittently rotated in the direction as indicated by the arrow. A radiation source 508, a stimulating ray source 510A, a light deflector 511, an erasing light source 514, and a cleaning roller 515, which are of the same types as those employed in the seventh embodiment are disposed outside of the drum-like recording member 501. Also, a photodetector 512 and a light guide member 513 which are of the same types as those employed in the seventh embodiment are disposed inside of the drum-like recording member 501. The embodiment shown in FIG. 17 is similar to that shown in FIG. 16, except that the recording member 501 has a different shape and is driven in the different manner. In the same manner as in FIG. 16, the recording member 501 is exposed to a radiation passing through an object 509 to have a radiation image stored thereon, and scanned with stimulating rays 510 emitted by the stimulating ray source 510A to obtain an electric signal corresponding to the radiation image from the photodetector 512 disposed on the side opposite to the stimulating ray irradiation side with respect to the recording member 501. In the eighth embodiment, since the recording material is formed rigidly and is not bent in the course of conveyance, it exhibits higher durability, yields a finer visible image, and is easier to manufacture than an endless belt-like recording material.

In the aforesaid seventh and eighth embodiments, the recording material is intermittently rotated one-fourth turn at a time. However, it is of course possible to rotate the recording material at different intervals. For example, in the embodiment of FIG. 16, the recording material may be provided in a triangular form and intermittently rotated one-third turn each time. Also, it is not always necessary to dispose the erasing zone independently of the image recording zone or the image read-out zone. For example, the erasing light source may be disposed in the interior of the image read-out zone, and used in such a manner that it is turned off during the image read-out operation and turned on after the image read out is finished. In this case, it is possible to rotate the recording material a half turn at a time. Though it is not always necessary to clean the recording material by use of the cleaning roller, the cleaning is effective to improve the quality of the reproduced radiation image.

In the aforesaid embodiments of the built-in type apparatus II, a plurality of stimulable phosphor sheets or a plurality of portions of a stimulable phosphor layer are sequentially passed through the recording, read-out and erasing steps to sequentially conduct the recording, readout and erasing for each sheet or each phosphor layer portion. However, it is also possible to first conduct the recording for all sheets or phosphor layer portions, and then collectively carry out the read-out for all radiation images stored thereon, followed by the collective erasing. The erasing may be conducted immediately after reading out each radiation image. This method is useful for continuous radiography, for example, angiography and kymography.

For this purpose, for example, in the fourth embodiment of FIG. 12, the stimulable phosphor sheets 2, 2, . . . may be disposed on the endless belt 1 over the entire circumference thereof in closely and equally spaced relation, and the recording may first be conducted for all sheets 2, 2, . . . by rotating the endless belt 1 one turn (at this time, the read-out system and the erasing system are turned off). In this case, the read-out and the erasing may be conducted during the next rotation of the endless belt 1. Or, in the seventh embodiment of FIG. 16, a stacker section may be formed to temporarily store a part of the endless belt-like recording member 401 in the zigzag form after a plurality of radiation images are recorded thereon, and then to send this part to the read-out section to collectively read out the radiation images stored on that part. In the seventh embodiment of FIG. 16, it is of course possible to collectively conduct the recording, read-out and/or erasing as in the modified form of the fourth embodiment. Conversely, the aforesaid stacker section may be provided in the embodiment of FIG. 12. It should be understood that the aforesaid method wherein the recording is collectively conducted, followed by collective read-out/erasing (or collective read-out and collecting erasing), can be employed in any of the fourth to eighth embodiments mentioned above.

In the fourth to eighth embodiments wherein the multi-layer optical filter substantially reflecting stimulating rays and substantially transmitting light emitted by the stimulable phosphor layer is applied to the built-in type apparatus II, the multi-layer optical filter is formed integrally with the recording material provided with the stimulable phosphor over the overall surface of the recording material. The recording material is secured to the transparent supporting material so that the multi-layer optical filter stands facing the supporting material, i.e. so that the multi-layer optical filter stands facing the photoelectric read-out means. Particularly in the seventh and eighth embodiments, the transparent supporting material, the multi-layer optical filter, and the recording material are stacked integrally in this order. However, the multi-layer optical filter may also be formed independently of the recording material and disposed between the recording material and the photoelectric read-out means. In this case, the multi-layer optical filter may be formed integrally with the transparent supporting material on its surface on the stimulating ray irradiation side, and the recording material may be secured on the multi-layer optical filter. Or, the multi-layer optical filter may be formed integrally with the transparent supporting material on its surface on the side of the photoelectric read-out means, and the recording material may be secured on the other surface of the transparent supporting material so as to stand facing the multi-layer optical filter. Alternatively, the multi-layer optical filter may be disposed to contact the surface of the transparent supporting material on the side of the photoelectric read-out means, or to contact the light input face of the light guide member disposed in the vicinity of the transparent supporting material, or may be disposed at an intermediate position between the transparent supporting material and the light guide member in spaced relation to both the transparent supporting material and the light input face of the light guide member. Or, the multi-layer optical filter may be formed directly on the light input face of the light guide member. In the case where the multi-layer optical filter is provided independently of the recording material and is not formed integrally with the transparent supporting material, since the multi-layer optical filter is not moved together with the transparent supporting material, the area of the multi-layer optical filter may be decreased to a size necessary for covering the light emitted by the recording material when it is exposed to stimulating rays. From the viewpoint of sharpness of the reproduced visible image, the multi-layer optical filter should preferably be disposed between the recording material and the transparent supporting material.

We claim:

1. A radiation image read-out apparatus for two-dimensionally scanning a stimulable phosphor sheet, which carries a radiation image stored thereon, with stimulating rays which cause said stimulable phosphor sheet to emit light in proportion to the stored radiation energy, and photoelectrically reading out the light emitted by the scanning portion of said stimulable phosphor sheet by use of a photodetector, wherein the improvement comprises a multi-layer optical filter which substantially reflects said stimulating rays and substantially transmits said light emitted by said stimulable phosphor sheet upon exposure to said stimulating rays, wherein said photodetector is disposed on the side opposite to the stimulating ray irradiation side with respect to said stimulable phosphor sheet, said multi-layer optical filter being disposed between said stimulable phosphor sheet and said photodetector.

2. An apparatus as defined in claim 1 wherein said multi-layer optical filter exhibits such characteristics that the reflectivity with respect to said stimulating rays is not lower than 60%, and the transmittance with respect to said light emitted by said stimulable phosphor sheet is not lower than 60%.

3. A radiation image read-out apparatus including a stimulating ray source for emitting stimulating rays to a stimulable phosphor sheet carrying a radiation image stored thereon, and a photodetector constituted by a photoelectric conversion device, which is divided into picture elements, and disposed to face said stimulable phosphor sheet,
wherein the improvement comprises a multi-layer optical filter which substantially reflects said stimulating rays and substantially transmits the light emitted by said stimulable phosphor sheet upon exposure to said stimulating rays, wherein said photodetector is disposed on the side opposite to the stimulating ray irradiation side with respect to said stimulable phosphor sheet, said multi-layer optical filter being disposed between said stimulable phosphor sheet and said photodetector.

4. An apparatus as defined in claim 3 wherein said multi-layer optical filter exhibits such characteristics that the reflectivity with respect to said stimulating rays is not lower than 60%, and the transmittance with respect to said light emitted by said stimulable phosphor sheet is not lower than 60%.

5. A radiation image recording and read-out apparatus including:
(i) a circulation and conveyance means for conveying at least one stimulable phosphor sheet for recording a radiation image thereon along a predetermined circulation path,
(ii) an image recording section disposed on said circulation path for recording a radiation image on said stimulable phosphor sheet by exposing said stimulable phosphor sheet to a radiation carrying image information,
(iii) an image read-out section disposed on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal, and
(iv) an erasing section disposed on said circulation path for, prior to the next image recording on said stimulable phosphor sheet for which the image read-out has been conducted at said image read-out section, having said stimulable phosphor sheet release the radiation energy remaining on said stimulable phosphor sheet,
wherein the improvement comprises a multi-layer optical filter which substantially reflects said stimulating rays and substantially transmits said light emitted by said stimulable phosphor sheet upon exposure to said stimulating rays, wherein said photoelectric read-out means is disposed on the side opposite to the stimulating ray irradiation side with respect to said stimulable phosphor sheet, said multi-layer optical filter being disposed between said stimulable phosphor sheet and said photoelectric read-out means.

6. An apparatus as defined in claim 5 wherein said multi-layer optical filter exhibits such characteristics that the reflectivity with respect to said stimulating rays is not lower than 60%, and the transmittance with respect to said light emitted by said stimulable phosphor sheet is not lower than 60%.

7. A radiation image recording and read-out apparatus including:
(a) a supporting material,
(b) at least one recording material fixed on said supporting material and provided with a stimulable phosphor layer for storing a radiation image,
(c) an image recording section for exposing said recording material to a radiation passing through an object to have a radiation image of the object stored on said recording material,
(d) an image read-out section provided with a stimulating ray source for emitting stimulating rays for scanning said recording material carrying said radiation image stored thereon, and a photoelectric read-out means for obtaining an electric image signal by reading out light emitted by said recording material scanned and stimulated with the stimulating rays,
(e) a means for circulating said recording material on said supporting material with respect to said image read-out section for enabling reuse of said recording material by repeatedly moving said supporting material and said image read-out section with respect to each other, and
(f) an erasing means for eliminating the radiation energy remaining on said recording material prior to image recording on said recording material after the radiation image is read out therefrom at said image read-out section,
wherein the improvement comprises a multi-layer optical filter which substantially reflects said stimulating rays and substantially transmits said light emitted by said recording material, wherein said supporting material comprises a transparent material, said photoelectric read-out means being disposed on the side opposite to the stimulating ray irradiation side with respect to said recording material at said image read-out section, said multi-layer optical filter being disposed between said recording material and said photoelectric read-out means.

8. An apparatus as defined in claim 7 wherein said multi-layer optical filter exhibits such characteristics that the reflectivity with respect to said stimulating rays is not lower than 60%, and the transmittance with respect to said light emitted by said recording material is not lower than 60%.

9. An apparatus as defined in claim 7 wherein said supporting material is an endless supporting material.

10. An apparatus as defined in claim 9 wherein said endless supporting material is an endless belt.

11. An apparatus as defined in claim 9 wherein said endless supporting material is a rotatable drum.

12. An apparatus as defined in any of claims 7 to 11 wherein said recording material is a stimulable phosphor layer overlaid on said supporting material.

13. An apparatus as defined in any of claims 7 to 11 wherein said recording material is a stimulable phosphor sheet releasably secured to said supporting material.

14. An apparatus as defined in any of claims 7 to 11 further comprising means for circulating said supporting material between said image recording section and said image read-out section.

15. An apparatus as defined in claim 7 wherein said supporting material is a plate-like supporting material.

16. An apparatus as defined in claim 15 further comprising means for moving said plate-like supporting material with respect to said image read-out section for conducting scanning with said stimulating rays.

17. A radiation image read-out apparatus for exposing a recording material provided with a stimulable phosphor and carrying a radiation image stored thereon to stimulating rays which cause said recording material to emit light in proportion to the stored radiation energy, and photoelectrically detecting the emitted light by use of a photodetector to read out said radiation image, wherein the improvement comprises a multi-layer optical filter which substantially reflects said stimulating rays and substantially transmits said light emitted by said recording material, wherein said photodetector is disposed on the side opposite to the stimulating ray irradiation side with respect to said recording material, said multi-layer optical filter being disposed between said recording material and said photodetector.

18. An apparatus as defined in claim 17 wherein said multi-layer optical filter exhibits such characteristics that the reflectivity with respect to said stimulating rays is not lower than 60%, and the transmittance with respect to said light emitted by said recording material is not lower than 60%.

* * * * *